United States Patent [19]

Tobin, Jr.

[11] 4,246,869
[45] Jan. 27, 1981

[54] BIRD FEEDER

[75] Inventor: Thomas J. Tobin, Jr., Leawood, Kans.

[73] Assignee: Heath Manufacturing Company, Coopersville, Mich.

[21] Appl. No.: 65,379

[22] Filed: Aug. 9, 1979

[51] Int. Cl.³ .............................................. A01K 39/01
[52] U.S. Cl. .................................................. 119/51 R
[58] Field of Search ...................... 119/26, 51 R, 52 R, 119/53; D30/14, 15

[56] References Cited

U.S. PATENT DOCUMENTS

| D. 105,521 | 8/1937 | Hall | D30/14 |
| D. 231,369 | 4/1974 | Kilham | D30/14 |
| 2,987,041 | 6/1961 | Bard | 119/52 R |
| 3,186,379 | 6/1965 | Grella | 119/51 R |
| 4,019,462 | 4/1977 | Palfalvy | 119/51 R X |

Primary Examiner—F. Barry Shay
Assistant Examiner—Robert P. Swiatek
Attorney, Agent, or Firm—Price, Heneveld, Huizenga & Cooper

[57] ABSTRACT

The bird feeder includes an elongated plastic tank having a series of axially spaced groups of feeding apertures about its periphery. The tank is sandwiched between base and top members, the top member including an access aperture and cover for filling it with food. Positioned about the exterior of the tank are a series of vertical perches on which the birds can perch in generally sideways fashion to eat.

9 Claims, 5 Drawing Figures

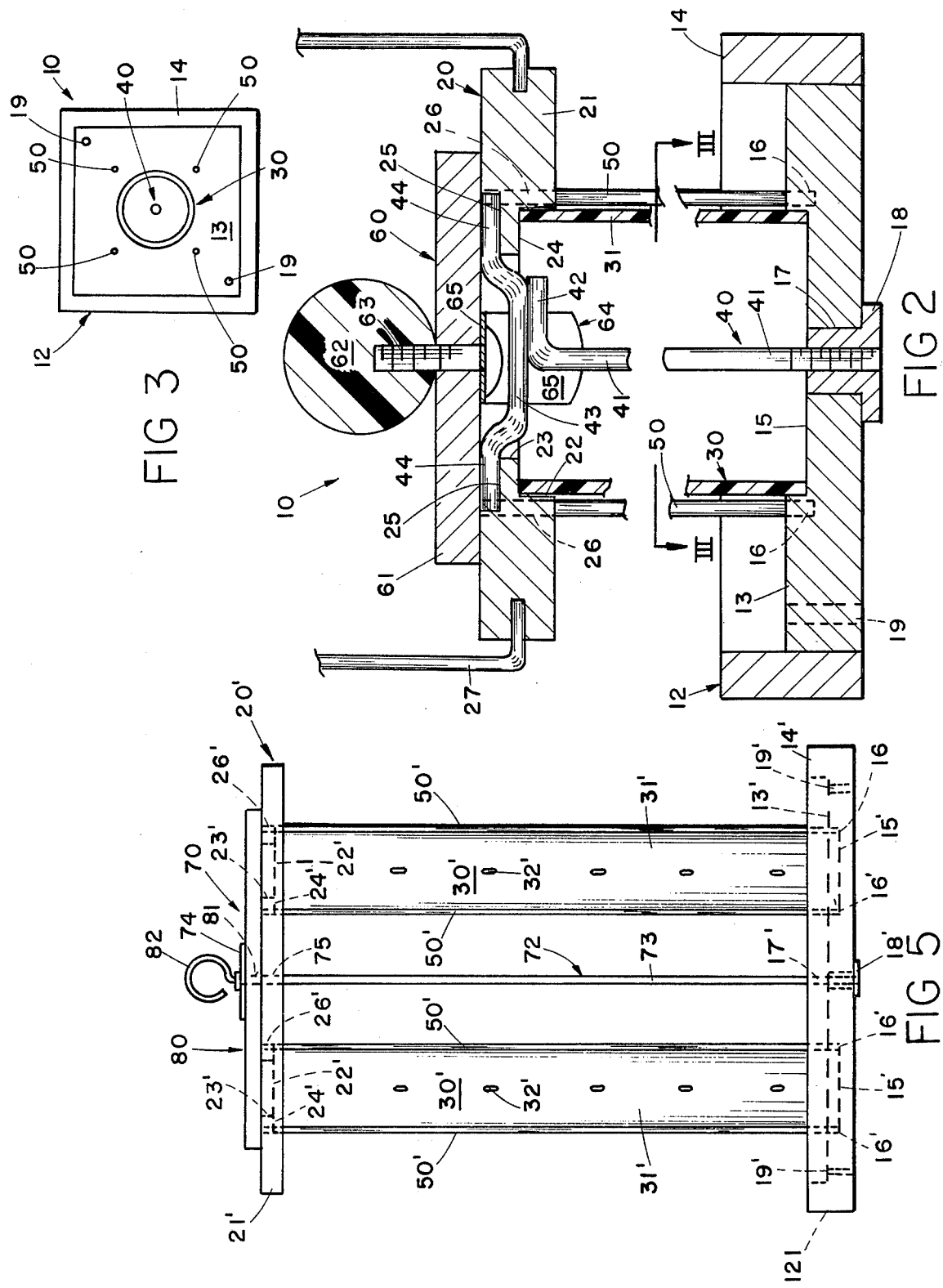

BIRD FEEDER

BACKGROUND OF THE INVENTION

This invention relates to bird feeders and, more particularly, to a novel bird feeder employing a vertical perch upon which the birds rest in sideways fashion to feed.

It is known in the art to provide vertical types of feeders having apertures in the sidewall thereof through which the food is accessible to the birds. A problem with such feeders in the past has been the relatively limited number of birds which can feed at a given time. This capacity restriction is the result, primarily, of the use of horizontal perches upon which the birds sit as they feed. Prior art feeders, insofar as known to the present inventor, have used this type of perch exclusively.

OBJECTS AND SUMMARY OF THE INVENTION

It is an object of this invention to provide a bird feeder which is not subject to the limited access drawbacks of prior art feeders. It is also an object of this invention to provide such a feeder which can be easily manufactured at relative inexpense, can be easily cleaned and/or filled and which is designed to substantially eliminate the wasting of feed.

These and other objects of this invention are accomplished by providing a bird feeder including an elongated, tubular food stroage tank having sidewalls surrounding a central axis and a series of vertically spaced feed access apertures in the sidewall. Means are provided to position the tank with its axis generally vertical. An elongated, vertical perch is positioned generally parallel to the axis of the tank on the exterior thereof in generally adjacent relationship to at least two of the vertically spaced apertures, thereby permitting several birds to feed from the apertures while perched in generally sideways orientation on the perch.

BRIEF DESCRIPTION OF THE DRAWINGS

FIG. 2 is a fragmentary, vertical section taken through the center of the feeder illustrated in FIG. 1 with the attachment rod assembly shown complete;

FIG. 3 is a horizontal section taken along the plane III—III of FIG. 2;

FIG. 5 is a front-elevational view of the embodiment of the invention shown in FIG. 4.

DESCRIPTION OF THE PREFERRED EMBODIMENTS

Figure 1:
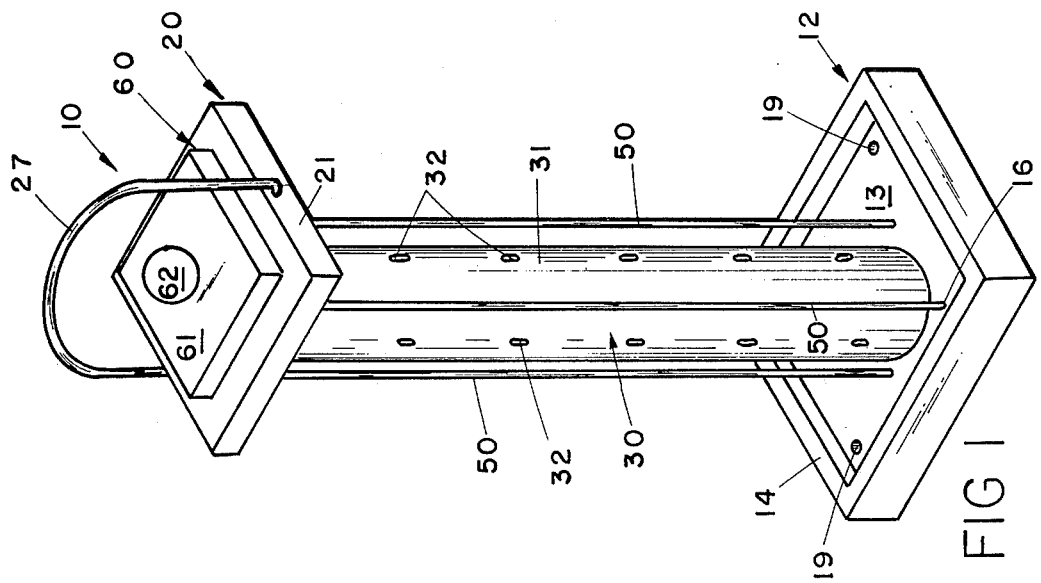
FIG. 1 is a perspective view of the bird feeder which is the subject of this invention.

Referring initially to FIGS. 1–3, the single-tank bird feeder 10 which forms a first embodiment of this invention includes a base assembly 12, preferably fabricated from wood. Base assembly 12 includes a generally horizontal platform 13 having an upstanding ledge 14 thereabout which, conveniently, may be made by tacking wooden strips to the side of platform 13. Base assembly 12 includes a central, circular feeding tube-receiving depression 15 having an interior diameter just slightly larger than the exterior diameter of the tube or tank member 30 to be discussed hereinafter. Base assembly 12 also includes a series of four blind perch-receiving apertures 16, an attachment rod aperture 17, a self-adhering nut 18 and drain holes 19.

Top assembly 20 includes a generally flat, rectangular block of wood 21 also having a central, circular feeding tube-receiving aperture 22 protruding into it from its lower surface. Aperture 22, approximately one-half way through block 21, necks down to form a reduced-diameter access opening 23, the same providing a shoulder 24 against which the upper, peripheral wall of tube 30 abuts.

The upper surface of block 21 is provided with two, diametrically opposite, yoke-receiving grooves 25 adjacent access opening 23. These grooves, as will become apparent hereinafter, receive the yoke of the attachment rod assembly 40 during assembly of the device.

Block 21 also incorporates four perch apertures 26 which, conveniently, may extend completely through. The top assembly 20 is completed by a bail member 27 suitable for carrying and hanging the assembled feeder.

Tubular feed container 30 is preferably fabricated from clear plastic, such as polyethylene, in the form of a right, circular cylinder 31. Spaced about the periphery of cylinder 31 at 90° intervals are vertically displaced groupings of feed access openings 32, four such peripherally spaced openings being provided at each level.

The attachment rod assembly 40 includes an elongated rod 41 threaded at its lower extremity so as to mate with nut 18. The upper extremity of rod 41 includes a right-angled bend 42 to which is affixed a yoke 43 having diametrically opposite, extending arms 44. The extremities of arms 44, as will be readily apparent to those skilled in the art, nest within yoke-receiving grooves 25 of top block 21.

Assembly of the unit as described to this point is accomplished by merely placing base 12 on a surface, nesting feed container 30 in the circular depression thereof and placing block 21 thereon with the upper extremity of cylinder 31 extending into aperture 23 and abutting shoulder 24. Attachment rod assembly 40 is then inserted in the position shown, and the top and bottom components rotated with respect to one another. This rotation causes the threaded end of rod 41 to enter nut 18 thereby tensioning rod 41 to firmly sandwich tube 31 between base assembly 12 and top assembly 20. Rotation is stopped at a point where four, blind, perch-receiving apertures 16 in base assembly 12 are in vertical alignment with perch apertures 26 in top assembly 20.

Four, elongated perch rods 50, which conveniently may take the form of wooden or plastic dowels, are then inserted from the top through apertures 26 downwardly until their lower extremities nest within blind apertures 16 in base assembly 12. The bird feeder is completed by attachment of a cap assembly 60 comprising a block of sufficient dimensions to overlie apertures 26. Cap assembly 60 includes a knob 62 suitably secured by a screw 63 which, conveniently, can also fasten thereto a spring-steel retainer 64 having opposed, resilient arms 65. Arms 65, as will be readily apparent to those skilled in the art, retain the cap in abutment with top assembly 20, except when the feeder is being filled, cleaned or the like.

Figure 4:
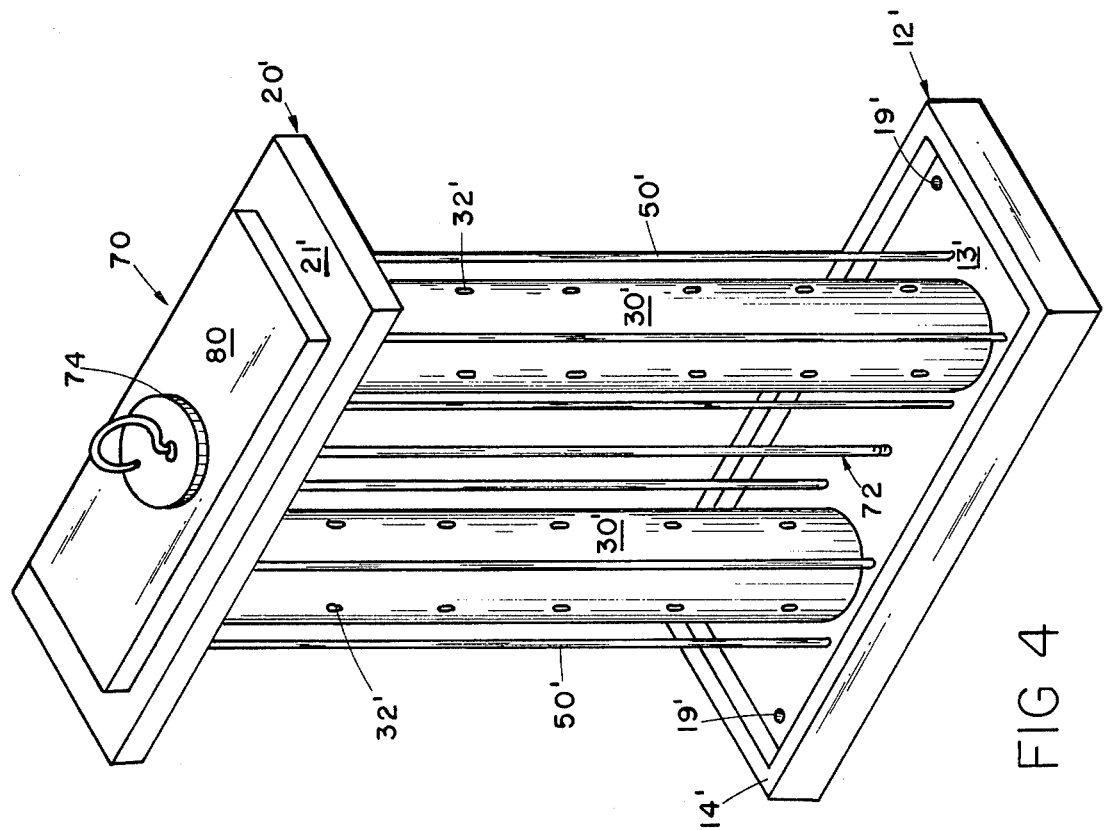
FIG. 4 is a perspective view of a modified embodiment of this invention.

Referring now to FIGS. 4 and 5, a modified embodiment of this invention includes two, separate feeding tanks and adjacent sets of perches. Modified embodiment 70 includes a base assembly 12', also preferably fabricated from wood, having a platform 13' with upstanding ledges 14' thereabout. Two, circular feeding tube-receiving depressions 15' are provided in the upper surface of platform 13'. Four, blind, perch-receiving apertures 16' are positioned about each depression 15'. Attachment rod aperture 17', in this case, is located between depressions 15' and incorporates a nut 18' of the type described in connection with the first embodiment. Platform 13' contains drain holds 19' to permit the drainage of moisture.

Top assembly 20' includes rectangular, wooden block 21' having two, spaced, circular feeding tube-receiving apertures 22' therein, the spacing corresponding to that of the depressions 15' in base assembly 12'. Two, reduced diameter access openings 23' are provided, each forming, at its junction with aperture 22', a shoulder 24' against which the tubular feed container 30' is adapted to abut. An aperture 75 is provided for passage of rod 73 therethrough.

The attachment rod assembly 72 comprises an elongated rod 73 threaded at its lower end to mate with nut 18'. The upper extremity of rod 73 has affixed thereto a circular shoulder adpated to bear against cap 80 to be hereinafter described. The rod 73 terminates at its upper extremity in a loop 82 by which assembly 70 can be carried or hung from a suitable support.

The assembly 70 of FIGS. 4 and 5 is completed by a wooden cap 80 having an aperture 81 through the center thereof. Cap 80, again, is preferably sized so as to overlie the upper extremities of perch apertures 26 and, thus, retain the perches 50' in position during utilization of the bird feeder.

Assembly of the embodiment shown in FIGS. 4 and 5 is accomplished by placing tubular feed containers 30', identical to the containers 30 discussed previously, into the depressions 15' in the base assembly 12'. The top assembly 20' is then placed over the top of the cylinders 30' with the upper extremities of the cylinders protruding into apertures 22' and abutting shoulder 24'. The eight, vertical perches 50', also identical to those discussed previously, are then fed from the top through apertures 26' and their lower extremities nested within blind apertures 16'. At this point, cap 80 is positioned over top assembly 20' and rod 73 threaded into nut 18'. Tensioning of this rod, of course, secures bird feeder 70 in fully assembled condition. Rod assembly 72, conveniently, may be permanently attached to cap 80 to facilitate mating of its lower extremity with nut 18'.

Birds feed from the feeders which are the subject of this invention by perching generally sideways on the perches 50 and 50'. Access to the food is gained by inserting their beaks into the apertures 32 and 32'. Many birds, as will be readily appreciated by those skilled in the art, can align themselves on each of the perches 50 in this orientation to take feed from the apertures 32. The embodiment of FIGS. 1–3, for example, can accommodate twenty birds, each with its own aperture 32 and more where apertures are shared. The embodiment of FIGS. 4 and 5, similarly, provides forty single-bird apertures.

The bird feeding apparatus which is the subject of the present invention has experienced considerable success in the feeding of small birds, such as finches, siskins, redpolls and chickadees. Best results have been experienced with the utilization of Niger (sometimes thistle) feed, crushed sunflower seeds and provo-millet.

Satisfactory experience has been obtained through the use of feed tubes 30 and 30' having a length of approximately 18 inches and a diameter of approximately 2¾ inches. The horizontal groupings of feed apertures are placed at 3 inch vertical intervals, the first commencing near the exposed bottom of the tube. The apertures, in the preferred embodiment of the invention, are oval-shaped having a horizontal dimension of approximately ⅛ inch and a vertical dimension of approximately ¼ inch. These spacings, of course, may be varied.

The perches, preferably, take the form of 3/16 inch diameter plastic dowels. Their centers are spaced from the exterior sidewall of tubes 31 and 31' approximately 5/16 inch. The position of the feed apertures with respect to the perches can be varied, as desired, by rotating tubes 31 and 31' within their respective assemblies. Best results have been obtained when the apertures are spaced approximately midway between the perches.

The upstanding ledges 14 and 14' surrounding platforms 13 and 13', respectively, retain food which has fallen from the apertures on the feeding station. The birds may perch in conventional eating orientation on these ledges to gain access to this food. They may, alternatively, eat the same while positioned near the lower extremities of the perches 50. The ledges function, in either event, to prevent the waste of food and, except during periods of extreme wind, do so with maximum efficiency.

It has been found in testing the feeders which are the subject of this invention that water sometimes tends to collect in the lower portions of tubes 31 and 31'. This can be remedied, where necessary, by placing a plug having a right, circular cylinder configuration in the base of tubes 31 and 31' such that the same rest on base members 12 and 12'. The plug, which can conveniently be formed from plastic, has a diameter almost equal to the inner diameter of the tubes and a height of approximately ¾ inch. It must be provided with an aperture for passage of rod 41 therethrough in the embodiment illustrated in FIGS. 1–3. No such aperture, obviously, is necessary for use with the embodiment illustrated in FIGS. 4 and 5.

While two preferred embodiments of this invention have been described in detail, it will be readily apparent to those skilled in the art that other embodiments may be conceived and fabricated without departing from the spirit and scope of this specification and the appended drawings. Such other embodiments are to be deemed as included within the scope of the following claims, unless these claims, by their language, expressly state otherwise.

The embodiments of the invention in which an exclusive property or privilege is claimed are defined as follows:

1. A bird feeder comprising: an elongated, tubular food storage tank having sidewalls surrounding a central axis; means to position said tank with said axis generally vertical; a series of vertically spaced apertures in said sidewalls; an elongated vertical perch; and means for positioning said perch generally parallel to said axis on the exterior of said tank in generally adjacent relationship to at least two of said vertically spaced aperture whereby several birds can feed from said apertures while perched in generally sideways orientation on said perch.

2. The feeder as set forth in claim 1 wherein there are a series of vertical perches so positioned about the exterior of said tank and wherein said apertures are peripherally as well as vertically spaced in said sidewall.

3. The feeder as set forth in claim 2 wherein said tank is open at both ends and which further comprises a base member underlying the lower open end of said tank; a top member overlying the upper end of said tank and means for compressing said tank between said base and top members.

4. The feeder as set forth in claim 3 wherein said perches extend between said base and top members.

5. The feeder as set forth in claim 4 wherein said perches comprise elongated dowels nested within vertically aligned blind apertures in said base member and through apertures in said top member whereby said perches can be attached to said feeder by passing them downwardly through said through apertures into said blind apertures.

6. The feeder as set forth in claim 5 wherein said top member has an opening therethrough permitting access to the interior of said tank and which further comprises a cover member and means for releasably retaining said cover member on said top member, said cover member, when so retained, overlying said through apertures to retain said perches in said feeder.

7. The feeder as set forth in claim 6 wherein said tank is circular, wherein said base member contains a circular depression on its upper surface receiving the lower end of said tank and wherein said upper member has a circular depression in its undersurface receiving the upper end of said tank, said depressions laterally stabilizing said tank with respect to said base and top members.

8. The feeder as set forth in claim 7 wherein said compressing means comprises an elongated rod having a yoke with oppositely extending arms at the top thereof; wherein said top member includes grooves in its upper surface for nestably receiving said arms and wherein said rod passes through said tank and is attached to said base member in axially adjustable fashion.

9. The feeder as set forth in claim 7 wherein there are two of said tanks compressed between said top and base members and wherein said compressing means comprises an elongated rod positioned between said tanks and affixed in tension between said top and base members.

* * * * *